US010205943B2

(12) United States Patent
Chen et al.

(10) Patent No.: US 10,205,943 B2
(45) Date of Patent: Feb. 12, 2019

(54) BITRATE DISTRIBUTION

(75) Inventors: Li Chen, Hampshire (GB); Alois Martin Bock, Hampshire (GB); David Horton, Hampshire (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 834 days.

(21) Appl. No.: 13/812,187

(22) PCT Filed: Jul. 28, 2010

(86) PCT No.: PCT/EP2010/060949
§ 371 (c)(1),
(2), (4) Date: Jan. 25, 2013

(87) PCT Pub. No.: WO2012/013226
PCT Pub. Date: Feb. 2, 2012

(65) Prior Publication Data
US 2013/0128955 A1    May 23, 2013

(51) Int. Cl.
H04N 19/115    (2014.01)
H04N 21/234    (2011.01)
H04N 21/2365   (2011.01)
H04N 19/149    (2014.01)
H04N 19/124    (2014.01)
H04N 19/14     (2014.01)
H04N 19/146    (2014.01)
H04N 19/15     (2014.01)

(52) U.S. Cl.
CPC ......... *H04N 19/115* (2014.11); *H04N 19/124* (2014.11); *H04N 19/14* (2014.11); *H04N 19/146* (2014.11); *H04N 19/149* (2014.11); *H04N 21/23406* (2013.01); *H04N 21/23655* (2013.01); *H04N 19/15* (2014.11)

(58) Field of Classification Search
None
See application file for complete search history.

(56) References Cited

U.S. PATENT DOCUMENTS 6,310,915 B1 * 10/2001 Wells et al. .............. 375/240.03
7,170,938 B1 *  1/2007 Cote et al. ............... 375/240.03

FOREIGN PATENT DOCUMENTS

GB    2 337 392     11/1999
WO    WO 95/29546   11/1995
WO    WO 2010/060463  6/2010

OTHER PUBLICATIONS

International Search Report for PCT/EP2010/060949, dated Nov. 17, 2010.

(Continued)

*Primary Examiner* — Mikhail Itskovich
(74) *Attorney, Agent, or Firm* — Baker Botts, LLP

(57) ABSTRACT

There is provided a method of processing video information, the method comprising encoding (430) received video information, the encoded video information having an encoded video bitrate (330), wherein the encoded video bitrate is variable in response to the complexity of the received video information. The method further comprises buffering (440) the encoded video information in a buffer (145), wherein the size of the buffer (145) is controlled in response to the complexity of the received video information.

17 Claims, 7 Drawing Sheets

(56) References Cited

OTHER PUBLICATIONS

International Preliminary Report on Patentability for PCT/EP2010/060949, dated Nov. 6, 2012.
Perkins et al., "Statistical Multiplexing of Multiple MPEG-2 Video Programs in a Single Channel", *SMPTE Journal*, vol. 104, No. 9, Sep. 1, 1995, pp. 596-599.

* cited by examiner (BMin)

(LeastBMin)

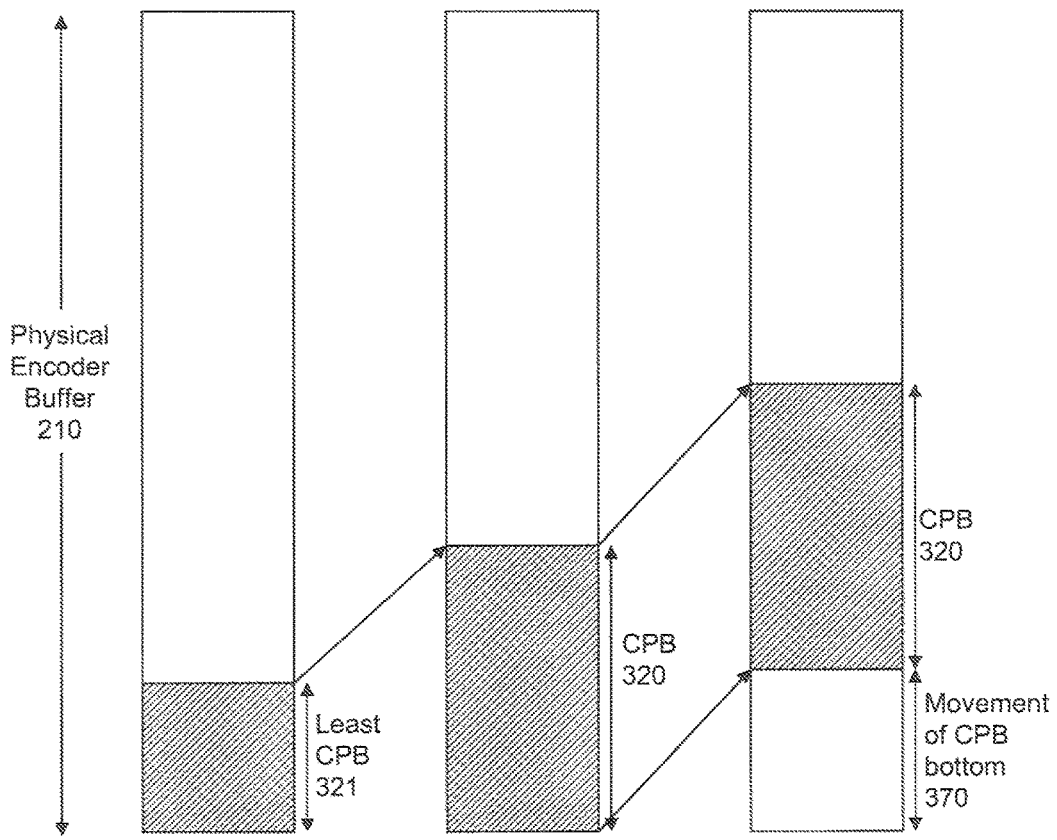

BITRATE DISTRIBUTION

This application is the U.S. national phase of International Application No. PCT/EP2010/060949 filed 28 Jul. 2010 which designated the U.S., the entire content of which is hereby incorporated by reference.

TECHNICAL FIELD

The present application relates to a method of processing video information, a video encoding apparatus, an encoder, a rate control, a bitrate controller and a computer readable medium.

BACKGROUND

Multiplexing is often used, for example, in the transmission of a plurality of channels in digital television. A multiplexing system can combine several input channels (or data streams) to form a single output data stream, where the total group bitrate of the output data stream is the sum of the bitrates of the constituent parts. The input data streams may be the outputs of video or audio compression systems, in which case the sum of their bitrates varies considerably with the nature of the content being compressed.

In a fixed share system each channel is constrained to a bitrate allocation which is an appropriate share of the total output bitrate. This requires that a particular channel picture quality must be constrained when the bitrate demand for that channel exceeds the fixed share bitrate allocated to that channel. Other channels may have spare capacity due to their lower instantaneous bitrate demands, but in such fixed share systems the spare capacity is filled with stuffing bits and is not available for use by other input channels.

Statistical multiplexing helps to avoid the quality loss and inefficient use of available output capacity present in fixed share systems. Statistical multiplexing allows a group of encoders to share a fixed total common bitrate, but instead of allocating a fixed bitrate to each encoder, a bitrate controller dynamically allocates different bitrates to each encoder dependant upon the instantaneous bitrate demand of the respective input video data streams.

Thus, when the bitrate demand of some input channels is lower than the average, the excess bitrate can be reallocated by the bitrate controller to allow a higher bitrate to be used by a channel which requires a higher bitrate to maintain picture quality. Available bitrate is allocated to the channel encoders according to demand, so that the system may achieve a more uniform picture quality on the output from each encoder. Available bitrate may also be allocated according to how critical the content being encoded is; during bitrate allocation an encoder processing critical content is given priority over an encoder processing less critical content. The bitrate controller ensures that the instantaneous total group bitrate is equal to or less than the channel capacity. By sharing out the total group bitrate between the channel encoders, the picture quality of all encoders can be improved compared to the average picture quality of a fixed share system.

Embodiments of the present application seek to improve the bitrate distribution in a statistical multiplexing system.

SUMMARY

There is provided a method of processing video information, the method comprising encoding received video information, the encoded video information having an encoded video bitrate. The encoded video bitrate is variable in response to the complexity of the received video information. The method further comprises buffering the encoded video information in a buffer; wherein the size of the buffer is controlled in response to the complexity of the received video information.

In a typical encoding system, the buffer size is constrained by encoding performance, which would deteriorate with too small a buffer for the particular application. Encoded video information is stored in the buffer. The buffer size is one factor that determines a minimum bitrate; the other is the delay time which must remain fixed for a system. If the delay were not fixed for, say, a television encoding/decoding system then the pictures output by a television would speed up or slow down. Because video arrives at an encoder at a regular frame rate, it must leave the decoder at the other end of the broadcast chain at the same regular frame rate, and in order to do this the delay between the two must be fixed. Reducing the size of the buffer upon receipt of simple video information means that the encoding bitrate can be reduced which in turn frees up bandwidth for use by other channels.

Simple video information may be defined as having an instantaneous bitrate demand below a threshold value. The instantaneous bitrate demand may be determined by a look-ahead handler. The complexity of video information is exhibited in the bitrate required to encode the video information at a predetermined quality level. More complex video information will require a higher encoded video bitrate than less complex or simple video information. Fast changing and very dynamic video sequences will give complex video information requiring a higher encoded video bitrate. A static image or even a substantially static image, such as a "talking head" or a newscast being read by a presenter, will accommodate a lower encoded video bitrate and are examples of simple video information.

A minimum encoded video bitrate may be defined by the size of the buffer or may be defined by a standard according to which the encoding is performed. A reduced size buffer may allow a low encoded video bitrate to be applied, the low encoded video bitrate less than the minimum encoded video bitrate.

Because both the bitrate and the picture buffer size are reduced below their normal minimums, a coding delay can be kept constant which means that the buffer compliance model is not violated. Thus, content encoded using the low encoded video bitrate that is lower than the defined minimum can still be decoded by a standard decoder.

The size of the buffer may be reduced in response to simple received video information. Upon positive detection of simple video information, the method may further comprise reducing the encoding bitrate to a low bitrate less than a defined minimum bitrate. A coding delay for simple video information may be the same as the coding delay for non-simple video.

The encoded video bitrate and the size of the buffer may be controlled dependent upon the complexity of a plurality of streams of received video information. The plurality of streams of video information may be transmitted as part of a multiplex. A statistical multiplexer may monitor the complexity of each of the plurality of streams of received video information and issue a bitrate allocation for each stream of video information. The complexity of the received video information may be defined by an instantaneous bitrate demand. The instantaneous bitrate demand may be measured by a look-ahead handler. The method may further comprise monitoring the complexity of each of the plurality of streams of received video information and determining an encoded video bitrate allocation for each stream of video information.

A look-ahead handler may determine whether the received video information may be encoded at a bitrate less than the defined minimum bitrate. Alternatively, the look-ahead handler calculates an instantaneous bitrate demand for the received video information according to any quality of service requirements, and sends this instantaneous bitrate demand to a bitrate controller, which determines whether the received video information may be encoded at a bitrate less than the defined minimum bitrate.

The method may further comprise detecting the receipt of new video information having a higher complexity such that it will be encoded at a video bitrate greater than or equal to the minimum encoded video bitrate, and in response to a positive detection thereof increasing the size of the buffer.

The size of the buffer may be increased to a defined size, at which normal buffer and bitrate control procedures can be applied, ensuring that the new video information is appropriately encoded. The size of the buffer may be increased to a defined size, at which the encoded video bitrate may be varied above a threshold value independent of the buffer size. The threshold value of encoded video bitrate may be a minimum encoded video bitrate. The size of the buffer may be increased prior to encoding the new video information.

A look-ahead process may be used to determine when the transition from the predetermined bitrate to the minimum bitrate should be executed. An alternative solution is to begin the transition when non-simple video information is detected by the relevant look-ahead handler. Further efficiency gains can be had by delaying the transition back to the minimum bitrate as late as practicable.

There is also provided a video encoding apparatus. The video encoding apparatus comprises an encoder arranged to encode received video information, the encoded video information having an encoded video bitrate. The encoded video bitrate is variable in response to the complexity of the received video information. The video encoding apparatus also comprises a buffer arranged to buffer the encoded video information, wherein the size of the buffer is controlled in response to the complexity of the received video information.

The video encoding apparatus may further comprise a look-ahead handler to determine the complexity of the received video information. The video encoding apparatus may further comprise a plurality of encoders and buffers for handling a respective plurality of video information streams, and may further comprise a bitrate controller arranged to receive indications of the complexity of each stream of video information and issue a bitrate allocation for each stream of video information to each of the plurality of encoders. Each encoder may comprise a rate control, the rate control arranged to manage the size of the buffer in response to the bitrate allocation received from the bitrate controller.

There is also provided a rate control. The rate control is arranged to receive a bitrate allocation instruction from a bitrate controller. The rate control is also arranged to control the encoded video bitrate of a respective main encoder according to the bitrate allocation. The rate control is also arranged to manage a respective buffer, the buffer for buffering the encoded video information, wherein the size of the buffer is controlled in response to the bitrate allocation.

There is also provided a bitrate controller. The bitrate controller is arranged to receive indications of instantaneous bitrate demand for each of a plurality of video information streams. The bitrate controller is also arranged to set an encoding bitrate for each of a plurality of encoders, each encoder corresponding to one of the video information streams. Further, upon receipt of an instantaneous bitrate demand less than a threshold value, the bitrate controller sets an encode bitrate that requires a respective encoder to use a reduced size buffer to maintain a coding delay.

The indication of an instantaneous bitrate demand may be received from a look-ahead handler.

There is also provided a computer-readable medium, carrying instructions, which, when executed by computer logic, causes said computer logic to carry out any of the above described methods.

BRIEF DESCRIPTION OF THE DRAWINGS

A method of processing video information and corresponding apparatus' will now be described, by way of example only, with reference to the accompanying drawings, in which:

FIGS. 7a, 7b and 7c illustrate the CPB size change based on an instantaneous bitrate change from LeastBMin and LeastCPB, and in normal operation where bitrate is greater than BMin.

DETAILED DESCRIPTION

Figure 1:
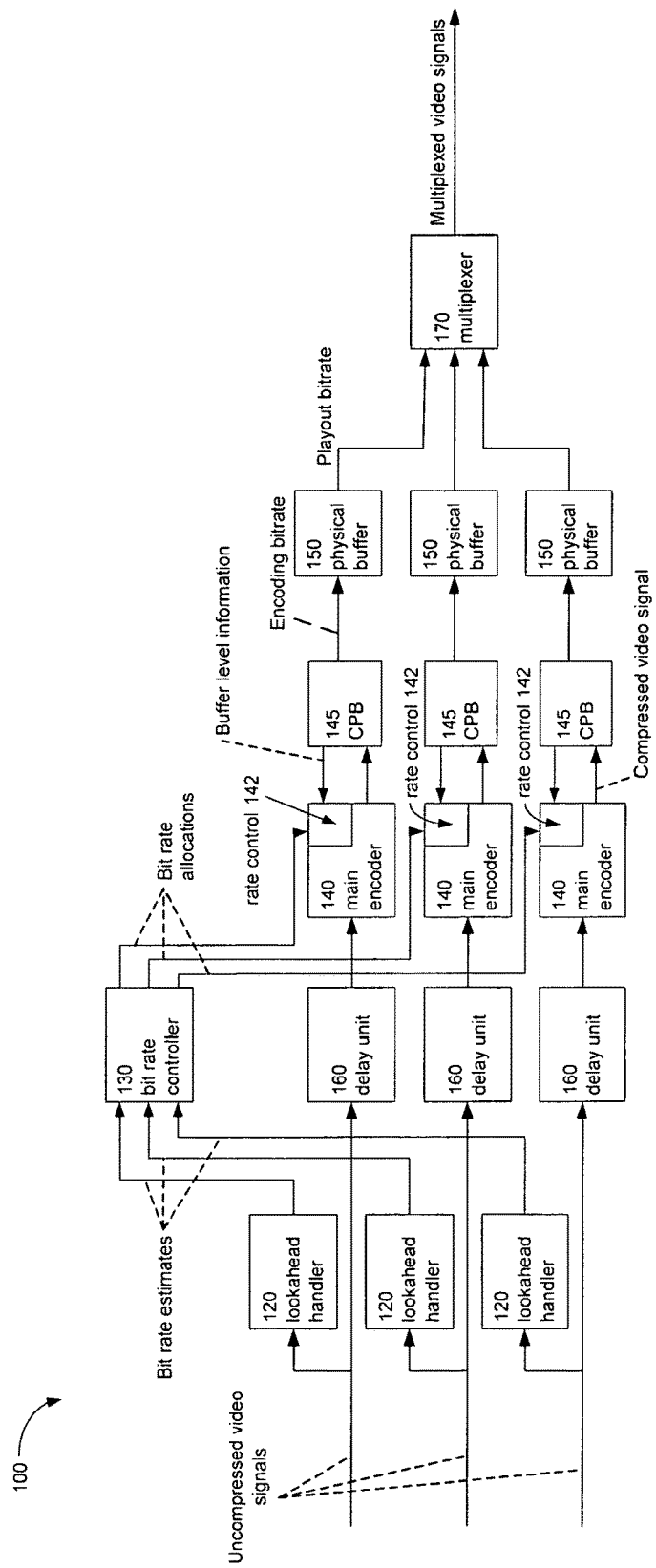
FIG. 1 shows a block diagram of a statistical multiplexing system.

FIG. 1 shows a block diagram of a statistical multiplexing system 100 with three look-ahead handlers 120 and three main encoders 140. The three main encoders 140 comprise a statistical multiplexing group within the statistical multiplexing system 100. Each look-ahead handler 120 receives a stream of video information for compression. The present embodiment is described as multiplexing three video streams. In other embodiments a different number of streams are combined. The stream may be a video signal. In other embodiments streams or signals of any combination of video, audio, or any other data stream are combined.

Each stream is also received by a respective delay unit 160 before being passed to the main encoder 140. Each look-ahead handler 120 outputs a instantaneous bitrate demand to a bitrate controller 130. The bitrate controller 130 provides a control signal to a rate control 142 in each main encoder 140. Each main encoder 140 has a coded picture buffer 145 connected thereto. Compressed video information passes from the main encoder 140 to a coded picture buffer 145. The compressed video information is then passed to a physical buffer 150 before being passed onto a multiplexer 170. The multiplexer 170 receives compressed video information from each of the three main encoders 140, via respective coded picture buffers 145 and physical buffers 150.

The look-ahead handlers 120 provide instantaneous bitrate demands to a bitrate controller 130. The instantaneous bitrate demands are based upon the uncompressed video signal. The instantaneous bitrate demands are used by the bitrate controller 130 to allocate bitrates to the main encoders 140. Delay units 160 are used on each channel, between the look-ahead handlers 120 and main encoder 140, to ensure the bitrate controller 130 maintains synchronisation with the respective portion of the input video channels. The delay units 160 compensate for the processing delay in both the look-ahead handlers 120 and the bitrate controller 130. This means that the control information corresponding to a particular part of the uncompressed video signal arrives at the main encoder 140 at substantially the same time as the particular part of the uncompressed video signal arrives at the main encoder 140. The bitrate controller 130 processes the instantaneous bitrate demands from all look-ahead handlers 120 and allocates appropriate bitrates to the main encoders 140 dependent upon the instantaneous bitrate demands. The bitrate controller 130 uses an allocation algorithm to determine the priority with which each main encoder 140 is awarded available bitrate. The allocation algorithm is responsive to the instantaneous bitrate demand and the criticality of the content to be encoded. Each main encoder 140 includes a rate control 142 which chooses quantization levels for the encoding algorithm to achieve the bitrate prescribed by the bitrate controller 130. Each main encoder 140 is connected to a respective coded picture buffer (CPB) 145 which is used during the encoding process. The CPB 145 is known as the Video Buffer Verifier in a system where MPEG-2 encoding is used. The physical buffer 150 stores the encoded information prior to multiplexing by the multiplexer 170. The output of the multiplexer 170 is passed to a transmitter, not shown in FIG. 1.

Figure 2:
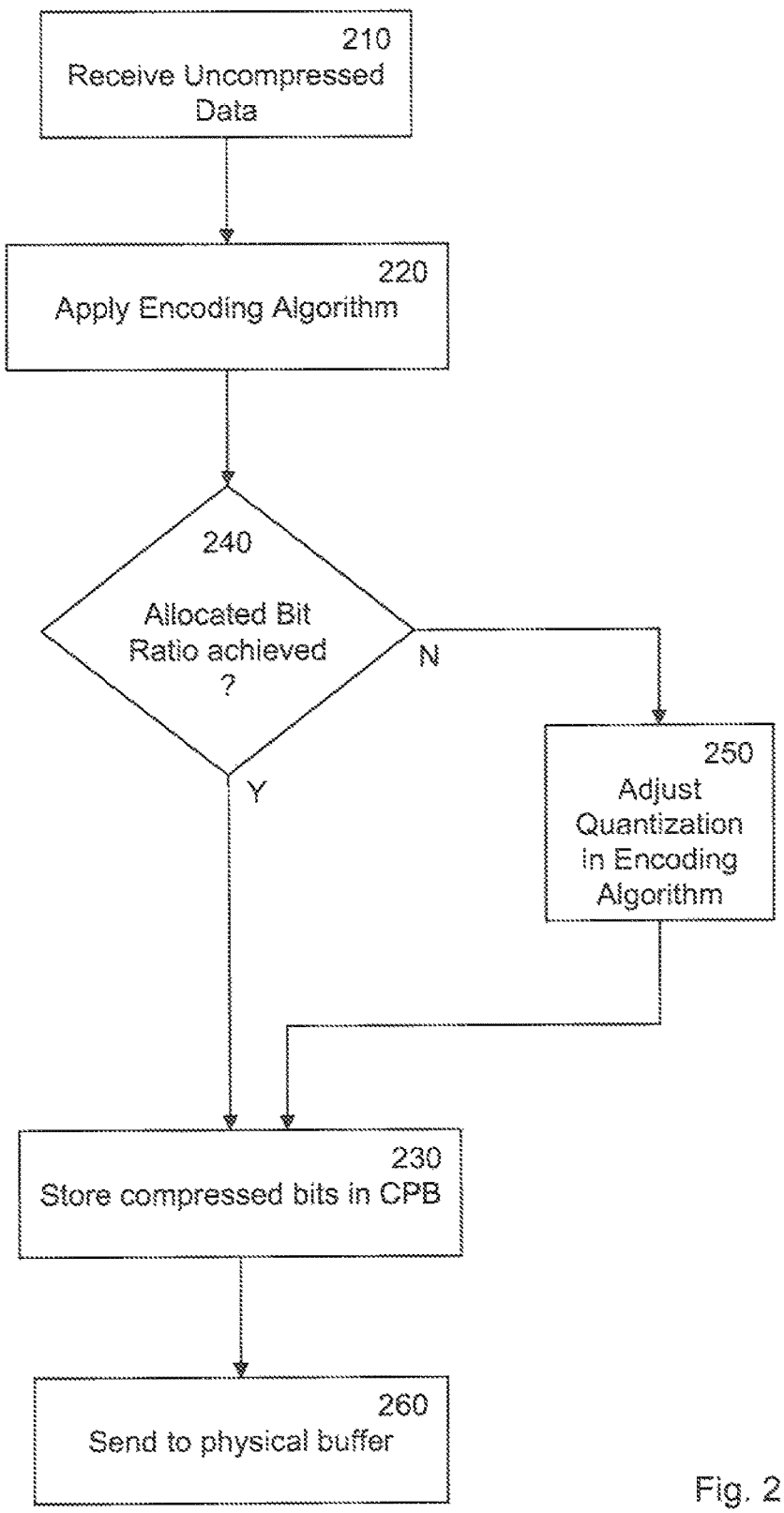
FIG. 2 illustrates an encoding procedure.

The operation of a main encoder 140 and rate control 142 is described with reference to FIG. 2. Uncompressed video information is received 210 by the main encoder 140 from the respective delay unit 160. An encoding algorithm is applied 220 to the uncompressed video signal to create compressed video information. Subsequent to the application of the encoding algorithm, it is determined 240 whether the compressed video information satisfies the bitrate requirement allocated by the bitrate controller 130. If it is determined 240 that the compressed video information satisfies the bitrate requirement allocated by the bitrate controller 130, then the compressed bits are stored 230 in the CPB 145. If the compressed video information does not satisfy the bitrate requirement allocated by the bitrate controller 130, then the compressed bits are still stored 230 in the CPB 145, but also the quantization of the encoding algorithm is adjusted 250.

Then the compressed bits are sent 260 to the physical buffer 150.

The CPB 145 may be a physical buffer within the main encoder, or it may be a virtual buffer. Alternatively, the CPB 145 may reside within a portion of the physical buffer 150. In that case, when a set of compressed bits are sent 260 from the CPB 145 to the physical buffer 150, the compressed bits do not need to be rewritten to a different portion of the physical buffer 150, the part of the physical buffer 150 that is addressed as the CPB 145 can be changed to no longer include the portion of buffer where the set of compressed bits are stored.

The size of the CPB 145 in a system according to the H.264 encoding standard is a trade-off between having sufficient size to handle complex video information, but not being so big that the minimum Bitrate (BMin) is too high. The CPB size, minimum bitrate and coding delay are related according to:

$$CPB = BMin * delay \qquad (1)$$

The coding delay, or delay time, is the time taken for video information to be processed through the encoder and decoder buffer. This must remain fixed to produce an output frame rate consistent with the input. The delay time is distinct from the delay unit 160. The delay units 160 ensure that the bitrate controller 130 maintains synchronisation with the respective portion of the input video information.

A full CPB 145, if not restocked by a main encoder 140, would empty over the delay time if drained at bitrate BMin. The minimum size of the CPB 145 is constrained by encoding performance. The size of the CPB 145 is chosen such that it may hold large picture sizes and such that it may provide acceptable picture quality; a CPB that is too small for a particular application will deteriorate the performance of the encoder. The size of the delay time contributes directly to the time required to change channel, which has an upper limit due to user expectations. The delay time is fixed for a particular system, and these two requirements typically require a BMin which is higher than desirable. For example, if there is taken to be an upper limit on the size of the delay, and a large CPB size were needed to provide a particular picture quality, then a large value for BMin would be required (from equation (1)).

Where the encoded signal uses a bitrate lower than BMin, the main encoder 140 generates stuffing bits to bring the bitrate up to match the minimum bitrate. This is a waste of that available bitrate. It would be more efficient if instead of sending stuffing bits, that capacity was used to allow a higher bandwidth for another channel.

Figure 3:
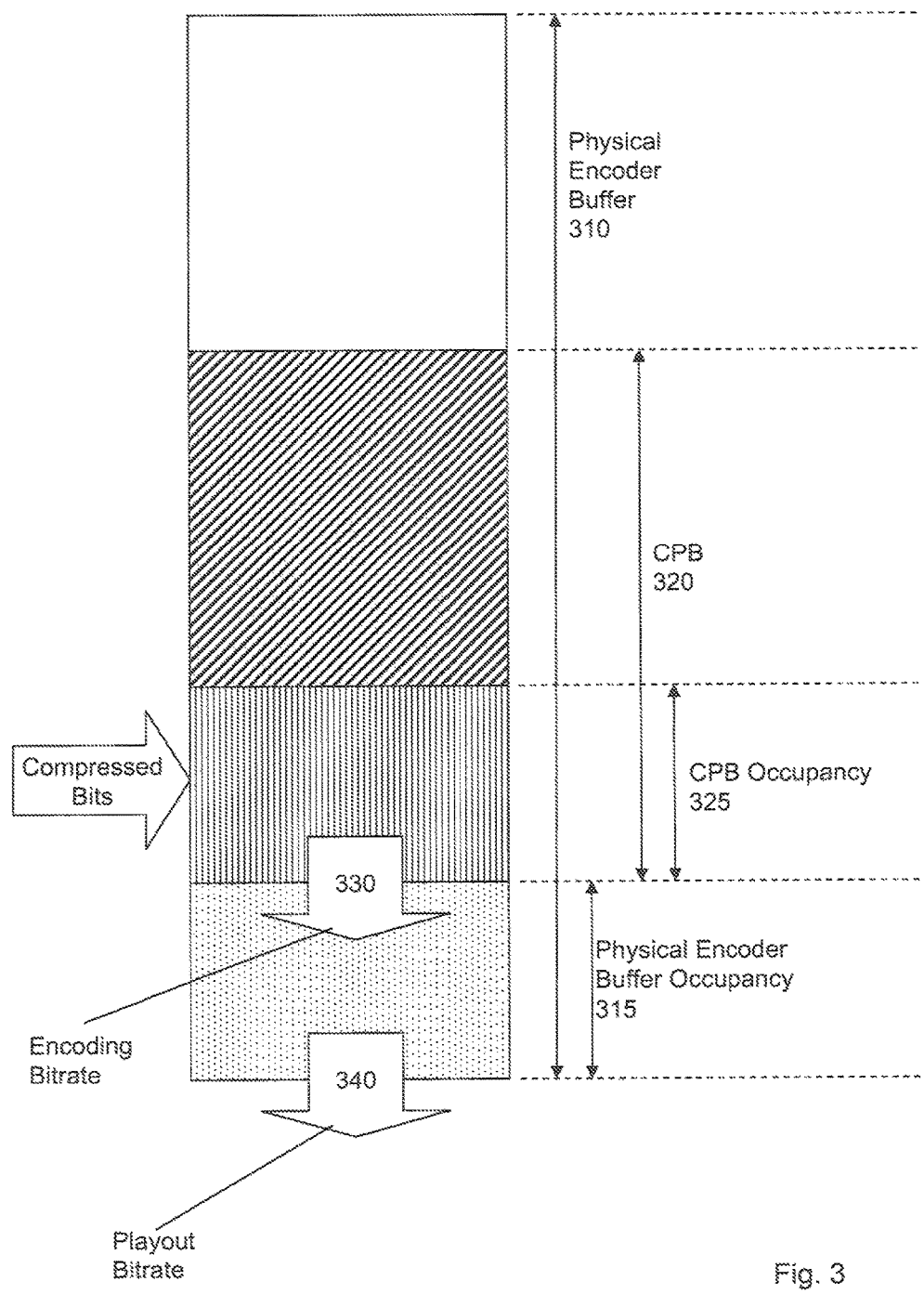
FIG. 3 shows a physical encoder buffer and how the CPB is handled within it.

FIG. 3 shows the physical encoder buffer 310 and how the CPB 320 is handled within it. In this example the CPB 320 occupies a portion of the same hardware buffer as the physical buffer 310. This encoder implementation uses a "sliding window" to manipulate the position of the CPB 320 in the physical encoder buffer 310. In FIG. 3 the physical encoder buffer occupancy 315 is shown as a dotted area. The CPB 320 is shown by diagonal shading. The vertical shading shows the CPB occupancy 325.

The part of the physical encoder buffer 310 apportioned to the CPB 320 changes with the instantaneous bitrates of the encoder. As shown in FIG. 3, the CPB 320 can be said to sit on top of the bits in the physical encoder buffer. The area of the physical encoder buffer 310 apportioned to the CPB 320 slides up with increasing occupancy of the physical encoder buffer. The area of the physical encoder buffer 310 apportioned to the CPB 320 slides down with decreasing occupancy based on instantaneous bitrates.

In hardware terms, both the CPB 320 and the physical encoder buffer 310 are part of the same buffer. However, in the present model, that hardware buffer is virtually divided into two parts: one is the CPB 320, which is managed by the rate control, and the other is the physical encoder buffer 310. When the bitrate controller 130 allocates a main encoder 140 a bitrate, the rate control checks the CPB occupancy 325 and possible picture quality, and modifies the encoding algorithm parameters to generate an output to the CPB 320. This bitrate will apply to the encoding process (which drains the CPB 320 into the physical encoder buffer 310) immediately but will apply to the playout process (which drains the physical encoder buffer 310) after the delay time. The encoding bitrate 330 is the rate at which bits are drained from the CPB 320 into the physical encoder buffer 310; and the playout bitrate 340 is the rate at which bits are drained from the physical encoder buffer 310. The playout bitrate 340 is equal to the encoding bitrate 330 but lags it by a period equal to the delay time.

When a main encoder 140 begins encoding a stream of video information, the physical encoder buffer 310 will start to drain at a playout bitrate 340 equal to BMin. This will proceed until the delay time has elapsed, at which point the playout bitrate 340 follows the encoding bitrate 330 by a lag equal to the delay time. For example, if delay time=2 seconds and BMin=1.5 Mbps, and in the first 2 seconds the statmux allocates an encoder 2.0 Mbps. In the first 2 seconds, the CPB 320 is lifted up (2−1.5)*2=1 Mbits, which is the physical encoder buffer occupancy 315 at t=2 seconds. Then assume that in the following 2 seconds, the statmux allocates 1.7 Mbps to the encoder. During these following 2 seconds, the previous encoding bitrate 330 of 2.0 Mbps becomes the playout bitrate 340 which is applied to drain the physical encoder buffer. However, during these 2 following seconds, bits are pushed into the physical encoder buffer at the speed of 1.7 Mbps. Accordingly, the CPB 320 moves by (1.7−2.0)*2=−0.6 Mbits. So, after 4 seconds, the physical encoder buffer has occupancy 315 of 0.4 Mbits and so the bottom of the CPB 320 sits at 0.4 Mbits.

The maximum size required of the physical encoder buffer 310 is calculated as $$\text{PhysicalBuffer}=B\text{Max}*\text{delay} \quad (2)$$

The rate control 142 in each main encoder 140 manages the encoding process to match the desired bitrate. The rate control 142 may manage various constraints including buffer model compliance and latency. The rate control 142 normally does not check the physical encoder buffer occupancy 315 as the size of the physical encoder buffer 310 is set to have a value greater than required.

It has been identified that some video information could be encoded at a bitrate lower than BMin and yet still achieve an acceptable picture quality. However, a problem with using a bitrate lower than BMin is that the encoded signal would not comply with the standard and so some, if not all, decoders would not be able to process it.

As described above, the size of the CPB 320 must be sufficient to handle large picture sizes. If the delay time is kept with a comparatively low value (to maintain an acceptable channel change time) then the value of BMin will be higher than a main encoder 140 requires for simple video content. Holding BMin for all main encoders 140 will require the use of stuffing bits when simple video content is encoded. The bandwidth that is held to supply a main encoder 140 with BMin when it is handling simple video content could be released for use by other channels. If the delay time were to vary, then buffer compliance would be broken and the encoded stream could not be decoded by a standard decoder. Therefore, the rate control 142 requires a new mechanism if a lower BMin is applied to the main encoder 140 in the system.

There is provided a new rate control method which breaks a normal BMin constraint and allows the statmux to allocate an encoder bitrate less than BMin for use on simple video content. This is done without violating the buffer model and constant delay time. This method benefits the whole system by releasing extra bandwidth to other channels and allowing more efficient bandwidth usage.

For explanatory purposes, a new value of LeastBMin is defined as a new bitrate, lower than BMin, which is to be used for simple video content. To maintain compliance with the relevant standard, a new value of LeastCPB is also defined. LeastCPB is the size of the coded picture buffer 320 that is used when LeastBMin is being used.

In one embodiment, LeastBMin and LeastCPB are minimum values for the reduced bitrate and reduced size picture buffer respectively. Then, a reduced bitrate and respective reduced CPB size may be used by an encoder with values lying between the minimum reduced values and the defined minimum values. In an alternative embodiment, the reduced bitrate and reduced picture buffer size have no minimum reduced values and the rate control 142 or bit rate controller 130 may select any values less than the defined minimum values but which deliver acceptable performance for the simple video information. In the latter embodiment, the values of LeastBMin and LeastCPB may be considered as example values for a reduced bitrate and reduced size picture buffer used.

The relationship between LeastBMin and LeastCPB is such that the value of delay time is constant and the same as when BMin is used, as follows $$\text{LeastCPB}=\text{Least}B\text{Min}*\text{delay} \quad (3)$$

If the standard rate control method were used for LeastBMin without changing the coded picture buffer size 320 then when the bitrate controller assigned a bitrate less than BMin there would be an excessive delay in the encoder, and a receiving decoder's buffer would underflow. The described method uses two minimum bitrates: BMin for normal video and LeastBMin for simple video. LeastBMin may be a predetermined value, or may be determined on the fly, and/or may be a minimum threshold. LeastBMin is less than BMin.

Figure 4:
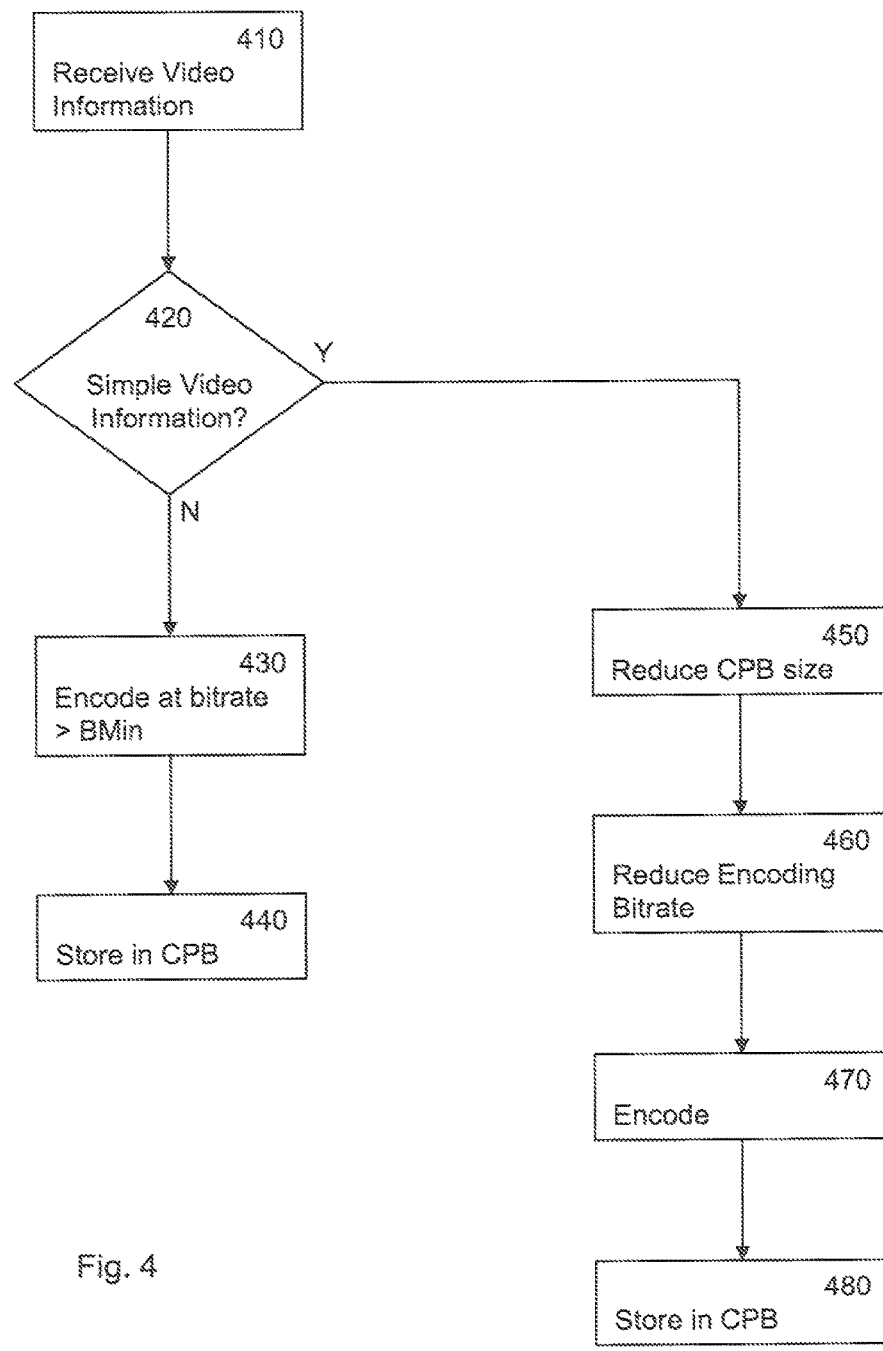
FIG. 4 shows a flow diagram of a method for encoding video information

FIG. 4 shows a flow diagram of a method for encoding video information. Video information for encoding is received 410. A determination 420 is made as to whether the video information received is simple video information. Simple video information is video information that can be encoded at a bitrate less than a minimum bitrate at an acceptable picture quality. The detection of simple video information may be performed by monitoring the output of a look-ahead handler 120.

If the determination 420 is negative, then the video information is encoded 430 at an encoding bitrate 330 BMin. Then the encoded video information is stored 440 in the CPB 145. If the determination 420 is positive, then: the size of the CPB is reduced 450; and the encoding bitrate is reduced 460 to a predetermined value <BMin. Then video information is encoded 470 at the predetermined value, and the encoded video information is stored 480 in the CPB 145.

In implementation any value of LeastBMin that is lower than BMin, and provides acceptable quality encoding of the simple video content may be used. This may be predetermined or may be determined by the bitrate controller 130 or the rate control 142 in the main encoder. The output of the look-ahead handler 120 may be used to determine the value of LeastBMin. LeastCPB is determined from LeastBMin so as to maintain a constant delay according to equation (3).

Two transition periods may receive special attention: one is from normal bitrate (≥BMin) to the new lower bitrate (LeastBMin); the other is from LeastBMin back to a normal bitrate (≥BMin).

Figures 5A, 5B:
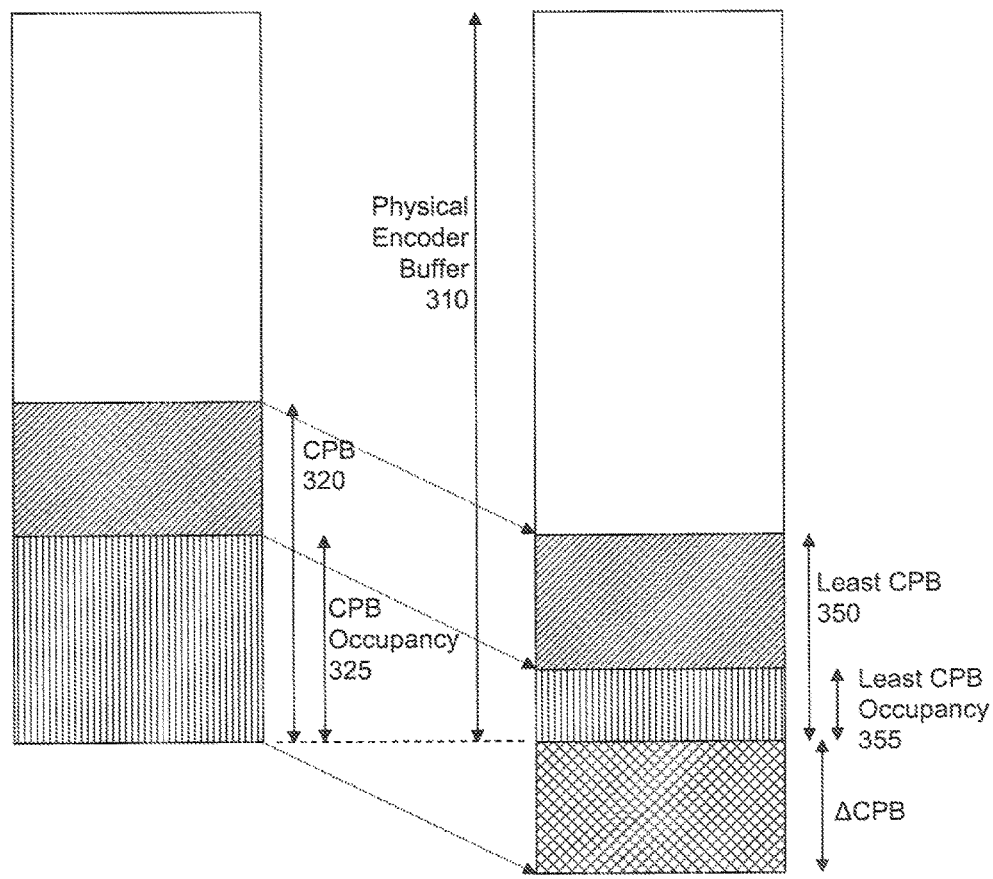
FIGS. 5a and 5b illustrate the change of CPB size in the case of a transition from BMin (FIG. 5a) to LeastBMin (FIG. 5b)

When the bitrate is changed to LeastBMin, the rate control 142 changes the size of CPB that it manages to LeastCPB in order to keep the delay time constant. FIGS. 5a and 5b demonstrate the change of CPB size 320 in the case of a transition from BMin (FIG. 5a) to LeastBMin (FIG. 5b). During the delay time, whilst the playout bitrate 340 is BMin and the encoding bitrate 330 is LeastBMin, the physical encoder buffer 210 must contain enough bits to satisfy the playout bitrate 340 at all times. The rate control 142 applies a rate control mechanism which performs the following operations:

where ΔCPB=CPB−LeastCPB

If ΔCPB≤CPB_Occupancy, do the following actions:

CPB_Bottom+=ΔCPB

CPB_Occupancy−=ΔCPB

Thus, the CPB occupancy 325 is reduced by ΔCPB by pushing these bits to the physical encoder buffer. The remaining bits in CPB 320 will then comply with LeastCPB.
If ΔCPBϕCPB_Occupancy
Generate some stuffing to the CPB 320 so that ΔCPB≤CPB_Occupancy; then do the following actions:

CPB_Bottom+=ΔCPB

CPB_Occupancy−=ΔCPB

To reduce the amount of stuffing required, once the look-ahead handler 120 detects LeastBMin, the main encoder 140 calculates the distance to the change point and adjusts the encoding parameters such as quantisation parameter (QP) smoothly.

As an alternative method of transitioning to LeastBMin, the transition period for CPB size 320 can start after the encoding bitrate 330 changes to LeastBMin. This may happen if the bottom of the CPB (CPB_Bottom) is allowed to take a negative value in the physical encoder buffer 310. For the bottom of the CPB 320 to slide below zero in the physical encoder buffer 310, the physical encoder buffer 310 directly pumps bits out from the CPB 320 until the playout bitrate 340 drops below BMin. The period over which this change takes place is the transition period from BMin to LeastBMin. During this period, the playout bitrate 340 is equal to or greater than BMin due to the necessity of keeping the delay time constant, so the rate control mechanism still manages the CPB 320 as though BMin were applied. As the stream of video information is compressed to a small size during this period, extra stuffing may be needed, or quantization parameter reduced, to generate bits at a rate matching the playout bitrate 340.

A difference between these two methods of transitioning to LeastBMin is that bits are generated either before or after the encoding bitrate 330 is changed. Where the bits are generated before the encoding bitrate 330 is changed a look-ahead process is required. No look-ahead is required by the latter method where the bits are generated after the encoding bitrate 330 is changed.

If the bitrate controller were to allocate an intermediate bitrate during the transition period, where the intermediate bitrate satisfies BMin>bitrate>LeastBMin, the CPB 320 will not slide down to −ΔCPB. The rate control mechanism would need to perform the following actions:

CPB_Bottom=ΔCPB+CPB_Bottom

CPB_Occupancy−=(ΔCPB+CPB_Bottom)

This would allow the rate control 142 to manage the size of LeastCPB for holding simple video content.

Figure 6A:
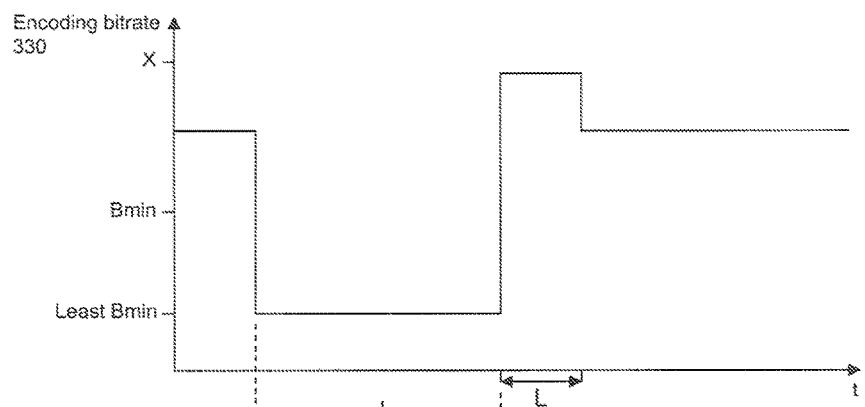
FIGS. 6a, 6b and 6c illustrate the encoding bitrate, playout bitrate, and a hypothetical playout bitrate, respectively during a transition to and from LeastBMin.
Figure 6B:
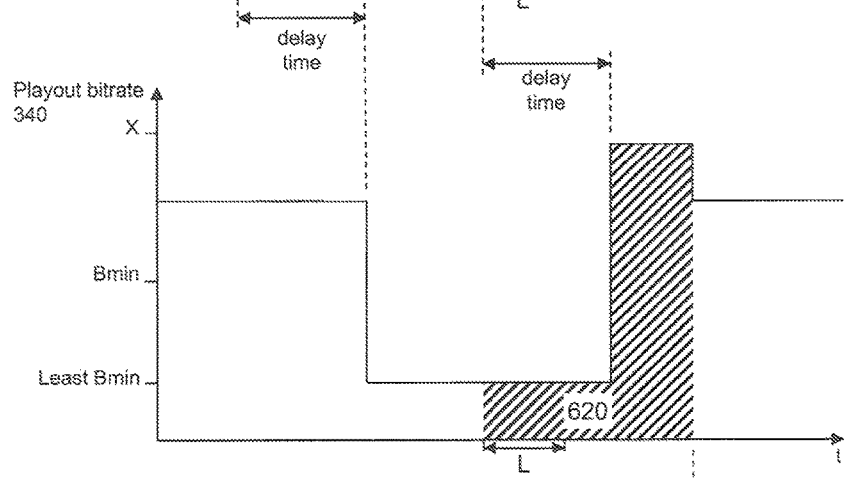

When normal video arrives, the encoding bitrate 330 needs to change from LeastBMin back to a normal bitrate (≥BMin) and LeastCPB correspondingly changes back to the normal CPB size 320. This process is shown in FIGS. 6a and 6b. Due to the delay time, bits are pumped into the physical encoder buffer 310 at the normal rate; but are extracted at LeastBMin until the delay time has elapsed. This would easily cause the decoder buffer to underflow due to the low transmit bitrate and extra stuffing, and because an image cannot reach the decoder buffer earlier than its decoder time stamp (DTS).

Figure 6C:
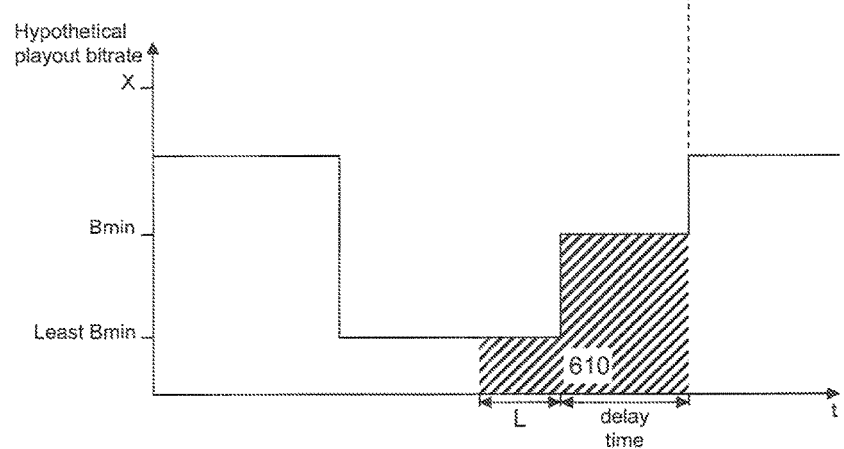

For illustrative purposes, consider if the physical encoder buffer 310 is drained at BMin instead of LeastBMin for the period of the delay time immediately after the encoding bitrate 330 changes from LeastBMin to the normal bitrate. This is shown in FIG. 6c. In this situation the system appears as if it had re-started and undertow is avoided. A transport stream generated in this way is compliant with the buffer model; but there is a problem that this arrangement violates the rule that the playout bitrate 340 must follow the encoding bitrate 330, lagging it by a period equal to the delay time.

The solution proved herein uses a look-ahead process, that is, once the look-ahead handler 120 detects the impending arrival of normal video content, it then demands a high bitrate a short period in advance of this arriving at the main encoder 140. The feasibility of this approach is demonstrated below.

We define the look-ahead length as L and bitrate at L is X, X corresponds to a normal bitrate at time L, where X>BMin. This is shown in FIGS. 6a and 6b, with FIG. 6a showing the encoding bitrate 330 and FIG. 6b showing the playout bitrate 340. Normal video information will enter the main encoder 140 at the end of the look-ahead period L. As shown in FIG. 6b, the physical encoder buffer 310 is drained at LeastBMin during L. As the stream of video information is still simple during the period of L and the encoding bitrate is normal, if no extra stuffing is inserted, the CPB 320 will underflow. However, if extra stuffing is inserted, this makes the picture size large and the decoder buffer will underflow. Thus a look-ahead alone cannot simply solve the buffer issue. The solution required is that the rate control mechanism manipulates the CPB 320 and the physical encoder buffer 310 to meet the buffer model.

For the period of the delay time after the start of the look-ahead period L, the physical encoder buffer 310 is drained at a playout bitrate 340 of LeastBMin. A high bitrate follows after the delay time and so the decoder buffer avoids underflow.

FIG. 6 shows the encoding bitrate 330 and playout bitrate 340 used to drain the CPB 320 and the physical encoder buffer 310 respectively. As mentioned before for illustrative purposes, if the physical encoder buffer 310 were drained at LeastBMin for period L and then BMin for the period of the delay time immediately after period L, then this gives an indication of how many bits should be sent out before the physical encoder buffer 310 is drained at the normal bitrate. This is the shaded area 610 in FIG. 6c. Similarly, at least the same amount of data must be drained from the physical encoder buffer 340 during this period of time to guarantee buffer model compliance. This is shown as the shaded area 620 of FIG. 6b. Based on this information, we have the following equation $$\text{Least}B\text{Min}*L + B\text{Min}*\text{delay} = \text{Least}B\text{Min}*\text{delay} + X*L \qquad (4)$$

From equation (4), X can be calculated as below:

$$X = (\text{LeastBMin}*L + B\text{Min}*\text{delay} - \text{LeastBMin}*\text{delay})/L \qquad (5)$$
$$= \text{LeastBMin} + (B\text{Min} - \text{LeastBMin})*\text{delay}/L$$

Assume X is less than a threshold T (X≤T), substitute X using Function (5), that is, $$\text{Least}B\text{Min}+(B\text{Min}-\text{Least}B\text{Min})*\text{delay}/L \leq T \quad (6)$$

and thus $$L \geq (B\text{Min}-\text{Least}B\text{Min})*\text{delay}/(T-\text{Least}B\text{Min}) \quad (7)$$

Equations (5) and (7) give details on the minimum look-ahead length that could be used based on known parameters (which could be identified from a configuration file) and also the corresponding bitrate requirements from the statmux given the look-ahead value L.

FIG. 7 illustrates the CPB size change based on an instantaneous bitrate change, that is, the CPB size is recovered from LeastBMin and LeastCPB 321 as shown in FIG. 7a to BMin and CPB 320 as shown in FIG. 7b. In a similar way that the required number of bits (ΔCPB) are pushed to the physical encoder buffer 310 from BMin to LeastBMin; these bits must be claimed back during a transition period from LeastBMin to the normal bitrate.

During the transition period, the bottom of the CPB 320 slides up due to high encoding bitrate and LeastBMin playout bitrate. Some bits in the top of the physical encoder buffer 310 are virtually moved 370 to the bottom of CPB until the total bits from the physical encoder buffer 310 equates to ΔCPB. The rate control mechanism performs this operation smoothly so as to maintain the buffer target occupancy whilst meeting bitrate demands. Ideally the transition time should be L; so the physical encoder buffer 310 can have a reasonably free buffer should that be required to satisfy peak demand later.

From equation (4), we have $$X*L = \text{Least}B\text{Min}*L + B\text{Min}*\text{delay} - \text{Least}B\text{Min}*\text{delay}$$

We can calculate the total movement of the CPB bottom during L as follows:

$$\begin{aligned}
\text{movement} &= X*L - \text{LeastBMin}*L \\
&= B\text{Min}*\text{delay} - \text{LeastBMin}*\text{delay} \\
&= \text{CPB} - \text{LeastCPB} \\
&= \Delta \text{CPB}
\end{aligned}$$

Therefore, if the statmux can allocate X during L, the CPB 320 and physical encoder buffer 310 operation can be completed within L.

In order to process the situation when the bitrate controller 130 cannot assign enough bitrate during L due to the limited bandwidth and trade-off between requests from other channels, the rate control 142 extends the transition period to the delay period (where L<delay). Therefore even if the assigned bitrate is less than X during L, ΔCPB may be fully claimed back later. Though with this operation there is then a risk of deteriorating the visual quality of the upcoming normal video content.

During normal operation, the bottom of the CPB 320 slides up dependent on the physical buffer occupancy 315, this is shown in FIG. 7c.

Where LeastBMin is not predetermined, and simple video content is received and encoded at LeastBMin, the rate control 142 allows the CPB bottom to slide down negatively. The instantaneous CPB buffer is set as CPB+=CPB_Bottom when CPB_Bottom is negative; and the playout bitrate is applied to drain from the CPB directly if CPB_Bottom is negative. The rate control 142 adds the dynamic limitation on available CPB size and also stuffing to avoid encoder buffer underflow. Subsequently, when the bitrate increases to normal bitrate, CPB_Bottom slides up from negative area based on instant encoding bitrate. The actual CPB size is increased correspondingly. This method allows flexible look-ahead length. In this method, it is possible that the look-ahead length is too short, such that the CPB buffer size may be insufficient to hold peak demand on subsequently received critical video.

As explained further above, this can be overcome by increasing the bitrate from LeastBMin to BMin during a look-ahead length. However, an alternative solution will now be described. Taking (as above) the look-ahead length as L and bitrate at L as X, where X corresponds to a normal bitrate at time L. X may be calculated dynamically with the aim of achieving the transition within the look-ahead period, according to:

if CPB_Bottom<0, then: $X=\text{Least}B\text{Min}-\text{CPB\_Bottom}/L$, otherwise, $X=B\text{Min}$. (8)

In this way, the look-ahead length is flexible which is based on latency between look-ahead processing and the main encoder. LeastBMin does not need to be predetermined, and the CPB size is correspondingly calculated based on the value of CPB_Bottom to ensure the constant delay time. CPB_Bottom is allowed to slide negatively whenever needed based on the instantaneous encoding and playout bitrate.

The described method and apparatus has advantages over known commercial statistical multiplexing systems. Known systems do not allow allocation of any bitrate less than the minimum bitrate as this would cause variable delay time and/or buffer model violation. An encoder with trivial video content has to generate extra stuffing to meet the minimum bitrate and this wastes bandwidth. By applying the described method and apparatus, the statistical multiplexing can manage bandwidth with more flexibility and use it more efficiently so as to potentially achieve better video quality for all channels.

It will be apparent to the skilled person that the exact order and content of the actions carried out in the method described herein may be altered according to the requirements of a particular set of execution parameters, such as speed of encoding, accuracy of detection, resolution of video sources, type of compression standards in use with the statistical multiplexing method, and the like. Accordingly, the order in which actions are described and/or claimed is not to be construed as a strict limitation on order in which actions are to be performed.

The invention claimed is:

1. A method of processing video information, the method comprising:
   allocating a first portion of a buffer to a coded picture buffer and a second portion of the buffer to a physical encoder buffer;
   based on a complexity of first received video information determining that the first received video information may be encoded at a bitrate that is less than a threshold bit rate;
   adjusting the allocation of the first portion and the second portion of the buffer by reducing the first portion allocated to the coded picture buffer and increasing the second portion allocated to the physical encoder buffer to allow an encoding of the first received video information to be performed at the bitrate that is less than the threshold bit rate;

encoding the first received video information at a first encoded video bitrate that is less than the threshold video bit rate;

buffering, in the first portion of the buffer allocated to the coded picture buffer, the first received video information that is encoded at the first encoded video bitrate that is less than the threshold video bit rate;

detecting a receipt of new video information having a higher complexity than the first received video information;

based on the higher complexity of the new video information, determining that the new video information is to be encoded at a second encoded video bitrate greater than or equal to the threshold bitrate; and in response to the higher complexity of the new video information, adjusting the allocation of the first portion and the second portion of the buffer by increasing the first portion allocated to the coded picture buffer and decreasing the second portion allocated to the physical encoder buffer prior to encoding the new video information and storing the new information in the coded picture buffer of the buffer.

2. The method of claim 1, wherein a coding delay for simple video information is the same as the coding delay for non-simple video information.

3. The method of claim 1, wherein the first encoded video bitrate and the allocation of the first portion and the second portion within the buffer are controlled dependent upon the complexity of a plurality of streams of received video information.

4. The method of claim 3, the method further comprising:
monitoring the complexity of each of the plurality of streams of first received video information and determining an encoded video bitrate allocation for each stream of video information.

5. The method of claim 1, wherein the complexity of the first received video information is defined by an instantaneous bitrate demand.

6. The method of claim 5, wherein the instantaneous bitrate demand is measured by a process which precedes the encoding.

7. A method performed by a bitrate controller, the method comprising:
receiving indications of instantaneous bitrate demand for each of a plurality of video information streams;
setting an encoding bitrate for each of a plurality of encoders, each encoder corresponding to one of the plurality of video information streams;
upon receipt of an instantaneous bitrate demand that is less than a threshold value, sending a first instruction to an encoder to adjust an allocation of a first portion of a buffer to a coded picture buffer and a second portion of the buffer to a physical encoder buffer to reduce the first portion and increase the second portion to maintain a coding delay; and
upon receipt of an instantaneous bitrate demand greater than or equal to a threshold value, sending a second instruction to the encoder to adjust the allocation of the first portion and the second portion of the buffer to increase the first portion allocated to the coded picture buffer within the buffer and decrease the second portion allocated to the physical encoder buffer prior to encoding the new video information.

8. The method of claim 7, wherein the indication of an instantaneous bitrate demand is received from a handler.

9. A non-transitory computer-readable medium, storing instructions, which, when executed by a computer, causes the computer to:
allocate a first portion of a buffer to a coded picture buffer and a second portion of the buffer to a physical encoder buffer;
based on a complexity of first received video information, determine that the first received video information may be encoded at a bitrate that is less than a threshold bit rate;
adjust the allocation of the first portion and the second portion of the buffer by reducing the first portion allocated to the coded picture buffer and increasing the second portion allocated to the physical encoder buffer to allow an encoding of the first received video information to be performed at the bitrate that is less than the threshold bit rate;
encode the first received video information at a first encoded video bitrate that is less than the threshold video bit rate;
buffer, in the first portion of the buffer allocated to the coded picture buffer, the first received video information that is encoded at the first encoded video bitrate that is less than the threshold video bit rate;
detect a receipt of new video information having a higher complexity than the first received video information;
based on the higher complexity of the new video information, determine that the new video information is to be encoded at a second encoded video bitrate greater than or equal to the threshold bitrate; and
in response to the higher complexity of the new video information, adjust the allocation of the first portion and the second portion of the buffer by increasing of the first portion allocated to the coded picture prior to encoding the new video information.

10. The non-transitory computer-readable medium of claim 9, wherein a coding delay for simple video information is the same as the coding delay for non-simple video information.

11. The non-transitory computer-readable medium of claim 9, wherein the first encoded video bitrate and the allocation of the first portion and the second portion within the buffer are controlled dependent upon the complexity of a plurality of streams of received video information.

12. The non-transitory computer-readable medium of claim 11, wherein the instructions, are further operable when executed by the computer to cause the computer to:
monitor the complexity of each of the plurality of streams of first received video information and determining an encoded video bitrate allocation for each stream of video information.

13. The non-transitory computer-readable medium of claim 9, wherein the complexity of the first received video information is defined by an instantaneous bitrate demand.

14. The non-transitory computer-readable medium of claim 13, wherein the instantaneous bitrate demand is measured by a process which precedes the encoding.

15. A video encoding apparatus comprising:
a memory storing instructions; and
a processor communicatively coupled with the memory, the processor operable to execute the instructions to cause the processor to:
allocate a first portion of a buffer to a coded picture buffer and a second portion of the buffer to a physical encoder buffer;

determine, based on a complexity of a first received video information, that the first received video information may be encoded at a bitrate that is less than a threshold bit rate;

adjust the allocation of the first portion and the second portion of the buffer by reducing the first portion allocated to the coded picture buffer and increase the second portion allocated to the physical encoder buffer to allow an encoding of the first received video information to be performed at the bitrate that is less than the threshold bit rate;

receive the first video information;

encode the first video information at a first encoded video bitrate that is less than the threshold video bit rate;

detect a receipt of new video information having a higher complexity than the first received video information;

based on the higher complexity of the new video information, determine that the new video information is to be encoded at a second encoded video bit rate that is greater than or equal to the threshold bitrate; and in response to the higher complexity of the new video information, adjust the allocation of the first portion and the second portion of the buffer by increasing the first portion allocated to the coded picture buffer and decrease the second portion allocated to the physical encoder buffer prior to encoding the new video information.

16. The video encoding apparatus of claim 15, wherein the first received video information comprises a plurality video information streams, and the processor is further operable to execute the instructions to:

manage a plurality of buffers for handling the plurality of video information streams; and receive indications of the complexity of each stream of video information and issue a bitrate allocation for each stream of video information.

17. The video encoding apparatus of claim 16, wherein the processor manages the allocation of the first portion and the second portion within the buffer in response to the bitrate allocation received from the bitrate controller.

* * * * *